Patented June 19, 1923.

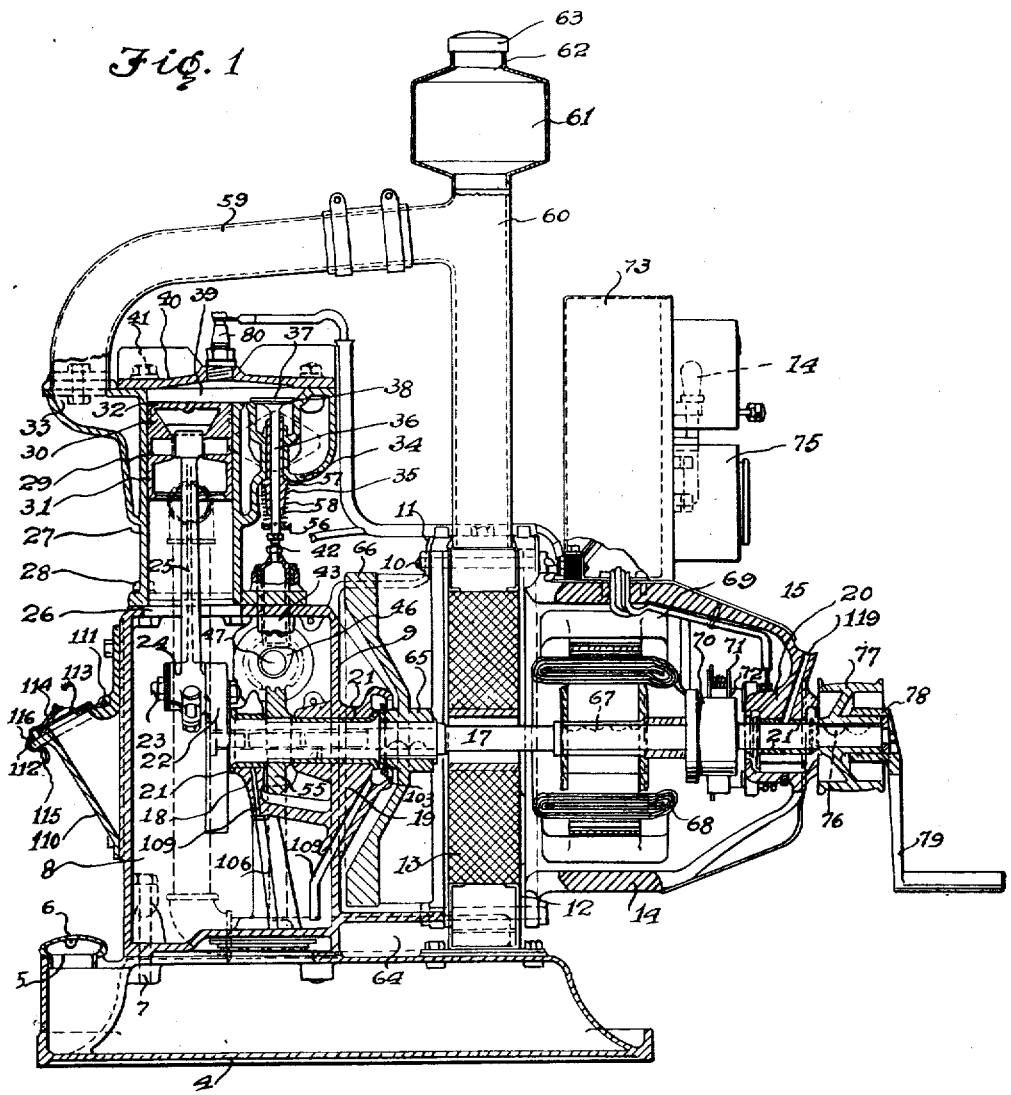

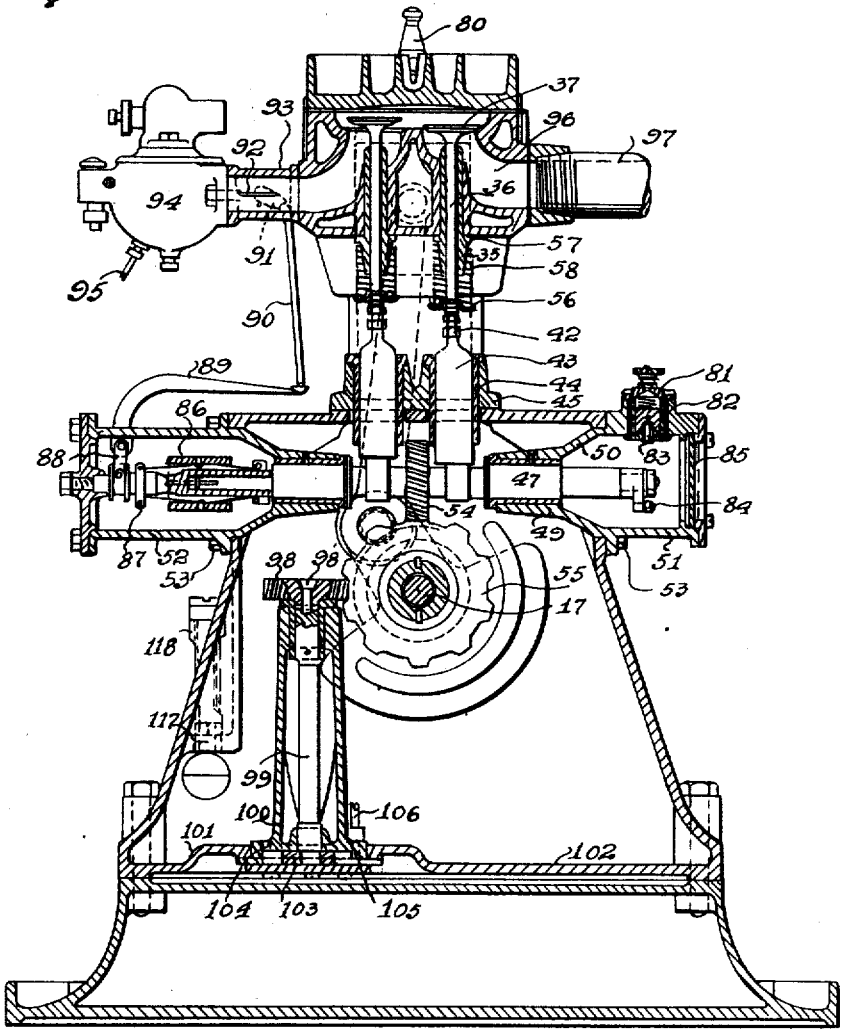

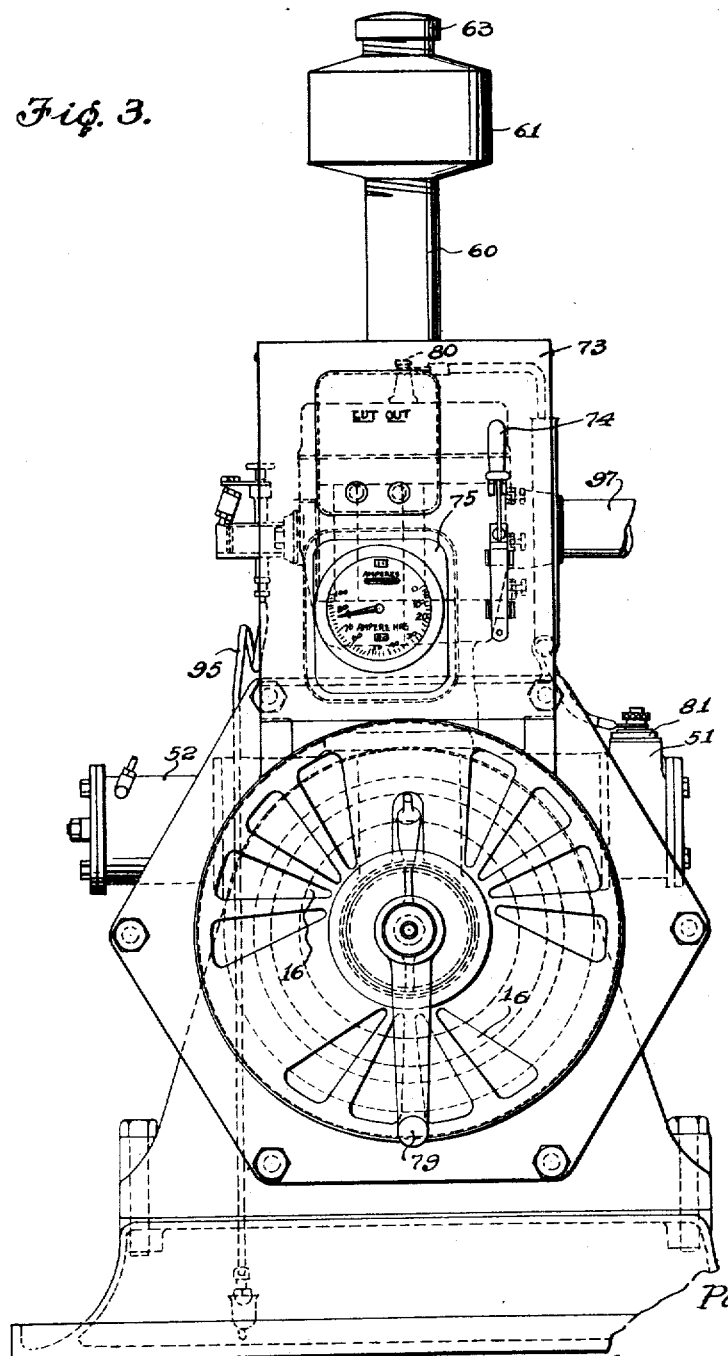

1,459,563

UNITED STATES PATENT OFFICE.

PAUL THAMM, OF NEW YORK, N. Y., ASSIGNOR TO S. WHYLE MERRITT CO. INC., OF NEW YORK, N. Y.

ELECTRIC LIGHT AND POWER PLANT.

Renewal of application Serial No. 375,626, filed April 21, 1920, and renewed December 3, 1921. This application filed December 27, 1922. Serial No. 609,346.

*To all whom it may concern:*

Be it known that I, PAUL THAMM, residing at New York city, in the county of New York and State of New York, a citizen of the United States, have invented certain new and useful Improvements in Electric Light and Power Plants; and I do hereby declare the following to be a full, clear, and exact description of the invention, such as will enable others skilled in the art to which it pertains to make and use the same.

My invention relates to improvements in electric light and power plants, and more particularly to a plant which is self-contained or comprises a single unitary structure. This application was filed originally April 21, 1920, Serial No. 375,626, allowed December 28, 1920, and renewed December 3, 1921, and allowed December 21, 1921.

The invention has for its principal object to provide a simple, efficient, economical and safe plant designed especially for domestic, business and farm lighting, for operating accessories requiring either motive or electric power, and for such other uses and purposes for which it may be adapted.

A further object is to provide a plant of this character, embodying a semi-automatic control, under the provisions of which the plant will not start automatically but will stop automatically whenever the batteries have been charged to their full capacity.

A further object is the provision of a compact, self-contained, durable and comparatively light construction, (1) wherein there is employed a single cylinder vertical gasoline engine connected directly with an electric generator; (2) wherein there is provided suitable storage batteries from which current can be drawn either for lighting purposes or for operating small electric motors; (3) wherein there is employed a switch board with the standard instruments necessary for the control of the system; (4) wherein there is provided a combined crank and generator shaft having a pulley from which direct power can be obtained; (5) wherein there is a cooling system of the thermo-siphon type including a cellular type of radiator located between the generator and the engine; (6) and wherein there is a fan fly-wheel located between the radiator and the engine so as to draw the air through the generator parts and the radiator core for keeping these parts cool.

Other objects and advantages will be made manifest in the following specification, and the preferred embodiment of the invention is illustrated in the accompanying drawings, forming a material part of this application, and in which:—

Fig. 1 is a central vertical longitudinal section through a plant made in accordance with my invention.

Fig. 2 is a vertical cross section taken on the line 2—2 of Fig. 1.

Fig. 3 is an end elevational view.

Referring in detail to the drawings, the numeral 4 represents a hollow engine base of substantially square form in configuration, the same being designed to serve as a gasoline reservoir and having at one end an opening 5 through which gasoline may be introduced. The opening 5 is normally closed by a cap 6. Bolted as at 7 upon the engine base is a crank casing 8, with which also is preferably cast as an integral feature thereof, the fan fly-wheel housing 9 whose forward end is open. Rigidly secured by bolts as 10 to the flared flange 11 of the fan fly-wheel housing, is a housing cast with a polygonal portion 12 which comprises a housing for the radiator 13, and a circular portion 14 having a forwardly tapering portion 15, the said portions 14 and 15 comprising a housing for the electric generator, and the said portion 15 being cast with groups of slots 16 to permit indrawing of the air as will presently appear.

17 represents a horizontal crank shaft, which is journaled in bearings 18 and 19 suitably cast for the purpose with the crank casing, and also in a bearing 20 cast in the forward end of the generator housing portion 15. In each of these bearings there is provided suitable bushings or bearing surfaces as 21, within which the crank shaft rotates. At its inner end within the crank casing, the crank shaft is cast or otherwise provided with the usual counterbalanced crank 22, carrying a crank pin 23, having operatively mounted thereon the connecting rod bearing 24 for the connecting rod 25, which projects upward for vertical operation through an opening 26, cut in the crank casing, and into the vertical cylinder casing 27, bolted as at 28 to the crank casing. At its upper end the connecting rod 25 carries a piston pin 29, operatively held in a piston pin bearing 30, suitably provided in a piston 31. This piston is fitted with two piston rings 32, especially designed to prevent smoking.

Cast with the cylinder casing 27 all around is a water jacket 33, in which on one side of the cylinder casing is cast bearings as 34, carrying glands 35 for the reciprocal operation of the stems 36 of the poppet valves 37, for each of which there is a seat 38. The poppet valves command the inlet and exhaust for the combustion chamber 39, suitably formed in conjunction with the walls of the water jacket, by a cylinder head 40, which is bolted securely to the water jacket as at 41.

The poppet valve stems 36 are adjustably connected as at 42 with lower enlarged stems 43, which extend through bushings 44 suitably provided in the bearings 45 bolted on the top of the crank casing. The lower ends of the enlarged stems 43 are acted on by cams 46, pinned on a shaft 47, which extends at right-angles to the crank shaft 17 and is rotatably mounted in bushings 48 suitably provided in bearings 49 cast on the tapering ends 50 of the aligned but spaced apart cylindrical housings 51 and 52, bolted as at 53 to the right and left sides of the crank casing as best shown in Fig. 2.

Between the cams 46, the shaft 47 carries a helical gear 54, which meshes with a similar gear 55 pinned on the crank shaft 17, by which arrangement the cam shaft 47 is driven for actuating the poppet valves, the helical gear connections being such that the cam shaft is driven at half engine speed. Surrounding each of the poppet valve stems 36, immediately above its adjustment 42, is a collar 56; and coiled about each stem between its collar 56 and a flange 57, formed on the gland 35, is a spring 58 which urges the valve stem downwardly thereby holding the enlarged stem portion in constant engagement with its cam.

Leading from the water jacket 33 is a water pipe 59, which is curved forwardly and opens into a vertical water pipe 60, fitted at its top end with a water riser 61 having an opening 62 through which the water is introduced. The opening 62 is normally closed by a cap 63. The vertical water pipe 60 communicates with a cellular radiator 13, from which leads a pipe 64, which extends first horizontally and then vertically to empty into the water jacket 33, so as to provide a thermo-siphon system of the well-known type for cooling the engine.

Keyed as at 65 upon the shaft 17 within the housing 9, is a fan fly-wheel 66, which, it will be observed, is thus located between the radiator 13 and the engine. In advance of the radiator within the housing portion 14, there is keyed on the shaft 17 at 67, an armature 68, which spins within the usual magnet 69 properly supported within the housing portion 14. 70 is a commutator whose poles 71 are wiped by the terminal brushes 72 for collecting the electric current, the said brushes being connected by a suitable wiring system with storage batteries (not shown) suitably located within the switch board casing 73, which contains the necessary standard instruments for controlling the system and including a cutout switch 74 and an ampere meter 75. Exteriorly of the tapering generator casing portion 15, there is keyed at 76 a pulley 77, which may be connected by a suitable belt with any device or accessories requiring motive power for their operation. Abutting the pulley 77, there is operatively connected on the shaft 17 the hub 78 of a starting crank 79.

Set in the top of the cylinder head 40 is the usual spark plug 80 which is connected in electrical circuit with the electric system including a circuit closing plug 81 which is attached to the housing 51 (Fig. 2) but insulated therefrom as 82, the said plug carrying the usual connecting wheel 83 designed to be engaged by a distributor 84 carried on the end of the cam shaft 47. The open end of the housing 51 is closed by a glass window 85 so that the operation may be observed. In the opposite housing 52 for the cam shaft, there is attached to the cam shaft a governor 86 of the centrifugal type and designed to be especially sensitive to speed variation. Associated with this governor is an axially movable collar 87 which is connected through the link 88, the curved link 89 the vertical link 90 and crank 91 with a butterfly valve 92, which controls the entrance through a pipe 93 of the gasoline mixture to the combustion chamber. The pipe 93 leads from a carburetor 94, which sucks its fuel from the gasoline reservoir through a pipe 95. 96 represents an opening for the exhaust which is accomplished through an exhaust pipe 97.

According to one feature of my invention, the crank casing also serves as an oil tank. The oil is circulated for the lubrication of the parts in the crank casing by means of a pressure pump of the gear type, located in the bottom of the crank casing. 98 denotes a helical gear which derives its power from a similar gear 55 keyed on the crank shaft. This helical gear is pinned to a vertical shaft 99, operatively supported in a cylindrical column 100, the lower end of which is secured to an upward deformation 101 cast for this specific purpose in the bottom plate 12 of the crank casing. The shaft 99 operates the usual pair of oil circulating gears 103, operatively arranged in a housing construct ed within the interior of the upward deformation 101. The oil passes to the gears 103 through an opening 104, and is forced out under pressure through an opening 105 into a pipe 106, which communicates with a bore 107 provided in the bearing 18 and bushing 21, so that the oil will be supplied in a copious amount to this bearing, a portion of the oil flow finding its way between the bearing and the shaft 17 to the baffle plate 108, which directs it back into the crank casing through a return pipe 109. Another portion of the flow of the oil, meeting with the rotating gear 55, is caused thereby under centrifugal action to lubricate the engaged helical gears 54 and 98. Through a central tapering opening 98', provided in the gear 98, the oil runs downwardly and around the shaft 99 so as to lubricate the latter.

The lubricant is introduced into the crank casing through a relatively large outwardly inclined spout 110, for which there is provided a closure, hinged at 111 and consisting of a ring shaped plate 112, on which is pinned a diaphragm 113. Yielding bearing on this diaphragm is a spring 114, which is curved as at 115 to snap under the outwardly projecting flange 116 that defines the mouth of the spout. This arrangement is provided in order that the diaphragm may yield outwardly and inwardly to take care of the variation of pressure within the crank casing and due to the vertical movements of the piston.

At 117 (Fig. 2) there is attached to the crank casing an oil gage 118. At the forward end of the crank shaft the bearing 21 may be oiled by hand through an opening 119.

This light and power plant comprises a very compact unit of comparatively light weight, designed especially for use on farms, in homes, stores, clubs, churches and the like. From its batteries may be drawn not only the power necessary for lighting purposes but also the power for operating accessories and necessary household articles such as vacuum cleaners, electric irons, electric fans, cookers and the like. From the pulley 27 power may be conveniently obtained for operating washing machines, churns, cream separators, water pumps and other devices. Practically the only care required for the operation of this plant is the periodical filling of the gasoline and oil tanks. The engine must be started through the manipulation of the starting crank in the usual way, but once started, it will continue to act until the batteries have been charged to their full capacity.

I do not wish to be understood as limiting myself to the specific details of construction and arrangement as herein described and illustrated, as it is manifest that variations and modifications may be made in such features of construction and arrangement, in the adaption of the device to the various conditions of use, without departing from the spirit and scope of my invention and improvements. I therefore, reserve the right to all such variations and modifications as properly fall within the scope of my invention and the terms of the following claims.

What I claim is:—

1. In an electric light and power plant, an engine provided with a crank shaft, a radiator surrounding said crank shaft having an annular water jacket, a water riser, a pipe connecting said water riser with the water jacket of the radiator, a cylinder casing having a water jacket, pipes connecting the radiator water jacket with the cylinder water jacket and the cylinder water jacket with the water riser and a generator and a fan mounted on said crank shaft, on opposite sides of said radiator, said fan adapted to draw air through the said generator and radiator.

2. In an electric light and power plant, a crank casing combined with a fan fly-wheel housing, a combined radiator and generator housing connected with the fan fly-wheel housing, a horizontal crank shaft operatively arranged in said casing and said housings, a cylinder casing secured to the crank casing and a piston therein having operative connection with said crank shaft, a combustion chamber formed with said cylinder casing and provided with inlet and outlet valves, an electric generator operated by said crank shaft, a cellular radiator located between said generator and said engine, a thermo-siphon system connected with said radiator for cooling the engine and a fan fly-wheel carried by said crank shaft in the fan fly-wheel housing between the radiator and the engine, said fan fly-wheel being designed to serve as a medium for drawing the air through the generator and radiator to keep them cool.

3. In an electric light and power plant, a crank casing combined with a fan fly-wheel housing, a combined radiator and electric generator housing connected to said fan fly-wheel housing, a crank shaft operatively arranged in said casing and said housings and operating an electric generator located in the generator housing, a cylinder casing secured upon the crank casing and having a piston, an operative connection between the piston and crank shaft, means combined with the cylinder casing to form a combustion chamber and a water jacket, a cellular radiator located in the radiator housing and having connection through an inlet and outlet pipe with said water jacket, inlet and outlet valves for said combustion chamber, means for operating the same and a fan fly-wheel located in the fan fly-wheel housing between the radiator and the engine and designed to draw the air through the generator and radiator for cooling the same.

4. In an electric light and power plant the combination of a hollow engine base forming a gasoline reservoir, a crank casing supported thereon and with which is combined a fan fly-wheel housing, a combined radiator and generator housing connected with the fan fly-wheel housing, a horizontal crank-shaft operatively arranged in said casing and said housings, a cylinder casing bolted to the crank casing and a piston therein having operative connection with said crank shaft, a combustion chamber formed with said cylinder casing and provided with inlet and outlet valves, an electric generator operated by said crank shaft within the generator housing, a cellular radiator located between said generator and said engine, a thermo-siphon system connected with said radiator for cooling the engine and a fan fly-wheel carried by said crank-shaft in the fan fly-wheel housing between the radiator and the engine, said fan fly-wheel being designed to serve as a medium for drawing the air through the generator and radiator to keep these parts cool.

5. In an electric light and power plant, the combination of a hollow engine base forming a gasoline reservoir, a crank casing bolted thereon and combined with the fan fly-wheel housing, a combined radiator and electric generator housing supported upon said base and bolted to said fan fly-wheel housing, a crank-shaft operatively arranged in said casing and said housings and operating an electric generator located in the generator housing, a cylinder casing bolted vertically upon the crank casing and having a piston, an operative connection between the piston and crank shaft, means combined with the cylinder casing to form a combustion chamber and a water jacket, a cellular radiator located in the radiator housing and having connection through an inlet and outlet pipe with said water jacket, inlet and outlet valves for said combustion chamber, means for operating the same from the crank-shaft and a fan fly-wheel located in the fan fly-wheel housing between the radiator and the engine and designed to draw the air through the generator and radiator for cooling these parts.

6. In an electric light and power plant, the combination of an engine base forming a gasoline reservoir, supporting elements bolted thereon and comprising a crank casing, a fan fly-wheel housing, radiator housing and generator housing, all arranged in horizontal alinement, a horizontal crank-shaft operatively arranged therein, a cylinder casing bolted upon the crank casing and having a piston connected with said crank-shaft, a combustion chamber and outlet and inlet valves therefor combined with the cylinder casing, a water jacket combined with the cylinder casing, a cellular radiator arranged about said crank-shaft and radiator housing, and having connection with said water jacket to provide a thermo-siphon cooling system for the engine, a fan fly-wheel located in the fan fly-wheel housing between the cellular radiator and the engine, an electric generator operated by the crank-shaft within the generator housing, said fan fly-wheel being designed to draw the air through the generator and cellular radiator for cooling these parts, a driving pulley located on said crank-shaft exteriorly of the generator housing, and a starting crank for said crank-shaft.

7. In an electric light and power plant, the combination of an engine base forming a gasoline reservoir, supporting elements secured thereon and comprising a crank casing, a fan fly-wheel housing, radiator housing and generator-housing, all arranged in horizontal alinement, a horizontal crank-shaft operatively arranged therein, a cylinder casing bolted upon the crank casing and having a piston provided with a connection with said crank-shaft, a combustion chamber and outlet and inlet valves therefor combined with the cylinder casing, a cellular radiator arranged about said crank-shaft within the radiator housing, and having connections to provide a thermo-siphon cooling system for the engine, a fan fly-wheel located in the fan fly-wheel housing between the cellular radiator and the engine, an electric generator operated by the crank-shaft within the generator housing, said fan fly-wheel being designed to draw the air through the generator and cellular radiator for cooling these parts, an oil pressure pump of the gear type located in the crank casing and operated from said crank-shaft and a conducting pipe between the oil pump and the engine bearings whereby to lubricate the latter.

8. In an electric light and power plant, the combination of an engine base forming a gasoline reservoir, supporting elements secured thereon and comprising a crank casing, a fan fly-wheel housing, radiator housing and generator housing, all arranged in horizontal alinement, a horizontal crank-shaft operatively arranged therein, a cylinder casing bolted upon the crank casing and having a piston provided with a connection with said crank-shaft, a combustion chamber and outlet and inlet valves therefor combined with the cylinder casing, a cellular radiator arranged about said crank-shaft and radiator housing, and having connections to provide a thermo-siphon cooling system for the engine, a fan fly-wheel located in the fan fly-wheel housing between the cellular radiator and the engine, an electric generator operated by the crank-shaft within the generator housing, said fan fly-wheel being designed to draw the air through the generator and cellular radiator for cooling these parts, a spout combined with the crank casing and through which the oil may be introduced thereinto, and a hinged closure for said spout including a diaphragm designed to respond to the variation of pressure within the crank casing as the piston operates therein.

In testimony whereof I have affixed my signature.

PAUL THAMM.